(12) United States Patent
Chervu

(10) Patent No.: US 10,611,311 B1
(45) Date of Patent: Apr. 7, 2020

(54) VEHICLE ROOF RACK CROSSBAR ASSEMBLY

(71) Applicant: Nissan North America, Inc., Franklin, TN (US)

(72) Inventor: Raghu Chervu, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/176,573

(22) Filed: Oct. 31, 2018

(51) Int. Cl.
*B60R 9/04* (2006.01)
*B60R 11/06* (2006.01)

(52) U.S. Cl.
CPC ............. *B60R 9/04* (2013.01); *B60R 11/06* (2013.01)

(58) Field of Classification Search
CPC ........... B60R 9/04; B60R 9/042; B60R 9/045; B60R 9/048; B60R 9/052; B60R 9/058; B60R 11/06
See application file for complete search history.

(56) References Cited

U.S. PATENT DOCUMENTS

| | | | | |
|---|---|---|---|---|
| 5,607,064 A * | 3/1997 | Fourel | ...................... | B60R 9/10 211/22 |
| 5,806,735 A * | 9/1998 | Christiansson | ......... | B60R 9/045 224/319 |
| 8,225,679 B2 * | 7/2012 | Flaherty | .................. | B60R 9/058 224/321 |
| 2017/0036331 A1 * | 2/2017 | Martinez | ............... | B25B 15/008 |

FOREIGN PATENT DOCUMENTS

| | | |
|---|---|---|
| DE | 10337540 A1 | 3/2005 |
| WO | 2018031335 A1 | 2/2018 |

* cited by examiner

*Primary Examiner* — Corey N Skurdal
(74) *Attorney, Agent, or Firm* — Global IP Counselors, LLP

(57) ABSTRACT

A vehicle roof rack crossbar assembly includes a vehicle crossbar and an installation tool. The crossbar includes a longitudinal body and a stanchion configured to support the longitudinal body to a vehicle roof rack component. The vehicle crossbar further includes a tool storing area configured to store the installation tool that is used for installing the crossbar to the vehicle roof rack component.

20 Claims, 9 Drawing Sheets

VEHICLE ROOF RACK CROSSBAR ASSEMBLY

BACKGROUND

Field of the Invention

The present invention generally relates to a vehicle roof rack crossbar assembly. More specifically, the present invention relates to a crossbar assembly configured to be installed to a vehicle roof rack component.

Background Information

Vehicle roof racks are generally secured to the roof of a vehicle and are effective to store and transport objects on the roof of the vehicle without interfering with passenger occupancy and without the limitations of common trunk designs. Vehicle roof racks typically include several elongated members, such as siderails and crossbars, which may be selectively and removably connected to the vehicle to form a frame or support structure. Items such as skis, bikes, luggage, and other large (and small) items can secured to the roof rack by conventional fastening means, such as using bungee cords.

SUMMARY

It has been discovered that vehicle crossbar assemblies are installed onto vehicle roof rack components using an installation tool that is stored for future use.

In view of the state of the known technology, one aspect of the present disclosure is to provided A vehicle roof rack crossbar assembly includes a vehicle crossbar and an installation tool. The crossbar includes a longitudinal body and a stanchion configured to support the longitudinal body to a vehicle roof rack component. The vehicle crossbar further includes a tool storing area configured to store the installation tool that is used for installing the crossbar to the vehicle roof rack component.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
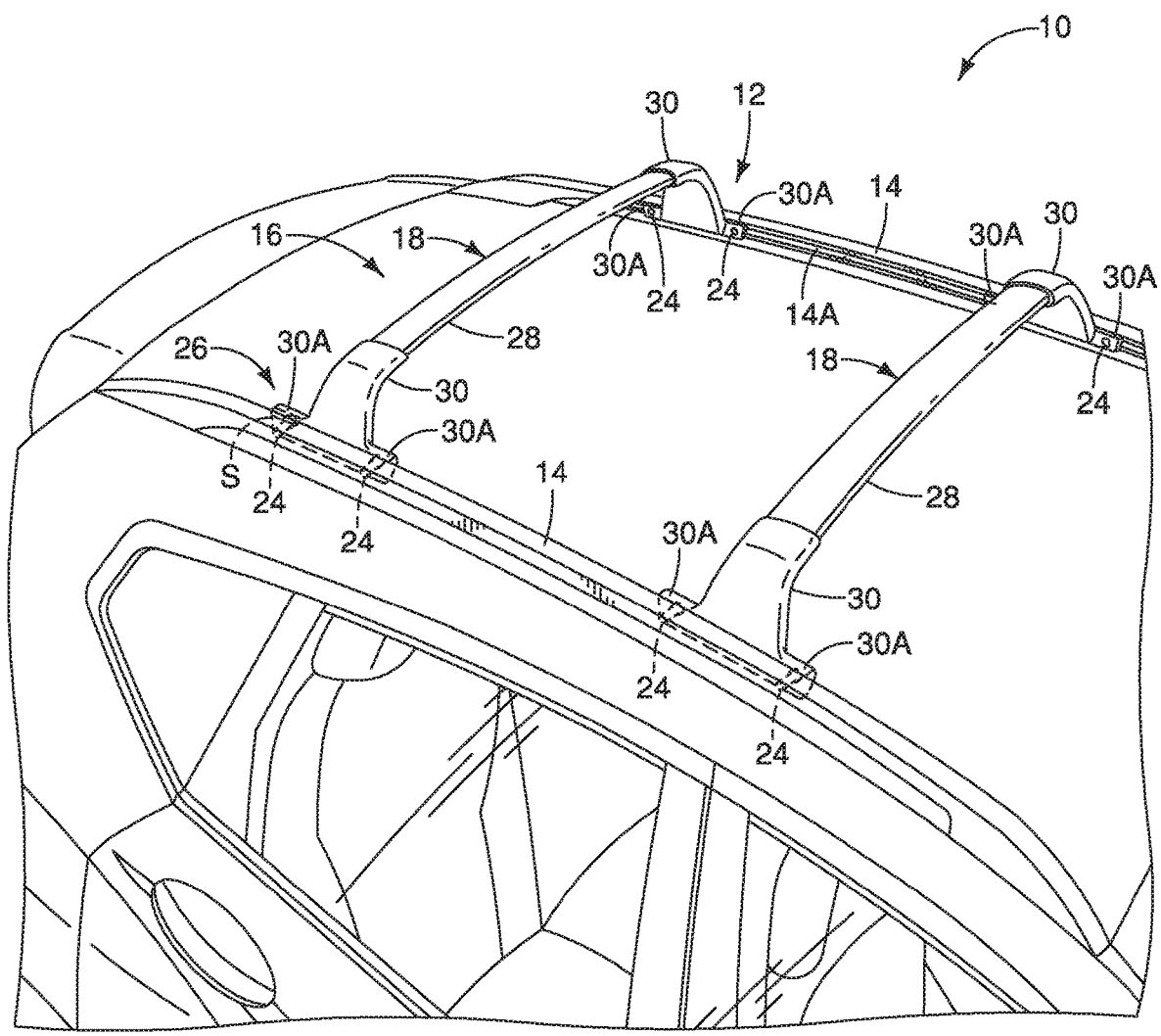
FIG. 1 is a top perspective view of a vehicle roof panel that is equipped with a vehicle roof rack having a crossbar assembly in accordance with a first illustrated embodiment.

Referring initially to FIG. 1, a vehicle roof panel 10 having a vehicle roof rack 12 is illustrated in accordance with a first illustrated embodiment. The vehicle roof rack 12 includes a pair of siderails 14 extending longitudinally along a lengthwise direction of the vehicle roof panel 10. The vehicle roof rack 12 further includes a crossbar assembly 16. The crossbar assembly 16 is fixed to the siderails 14. As shown, the crossbar assembly 16 include a pair of crossbars 18 extending laterally between the siderails 14. When the vehicle roof rack 12 is installed onto the roof panel 10, the crossbars 18 extend between the siderails 14 substantially perpendicularly to the siderails 14. In the illustrated embodiment, the vehicle roof rack 12 crossbar assembly 16 comprises a vehicle crossbar 18 and an installation tool 20 used for installing the crossbar 18 to the siderail 14, as will be further discussed below.

As the crossbars 18 are basically identical, only one crossbar 18 will be discussed for brevity. Similarly, as the siderails 14 are identical, only one siderail 14 will be further discussed for brevity. Thus, while the crossbar assembly 16 is illustrated as including a pair of crossbars 18, it will be apparent to those skilled in the vehicle field from this disclosure that the crossbar assembly 16 can include a single crossbar 18 or additional crossbars 18, as needed and/or desired.

Figure 3:
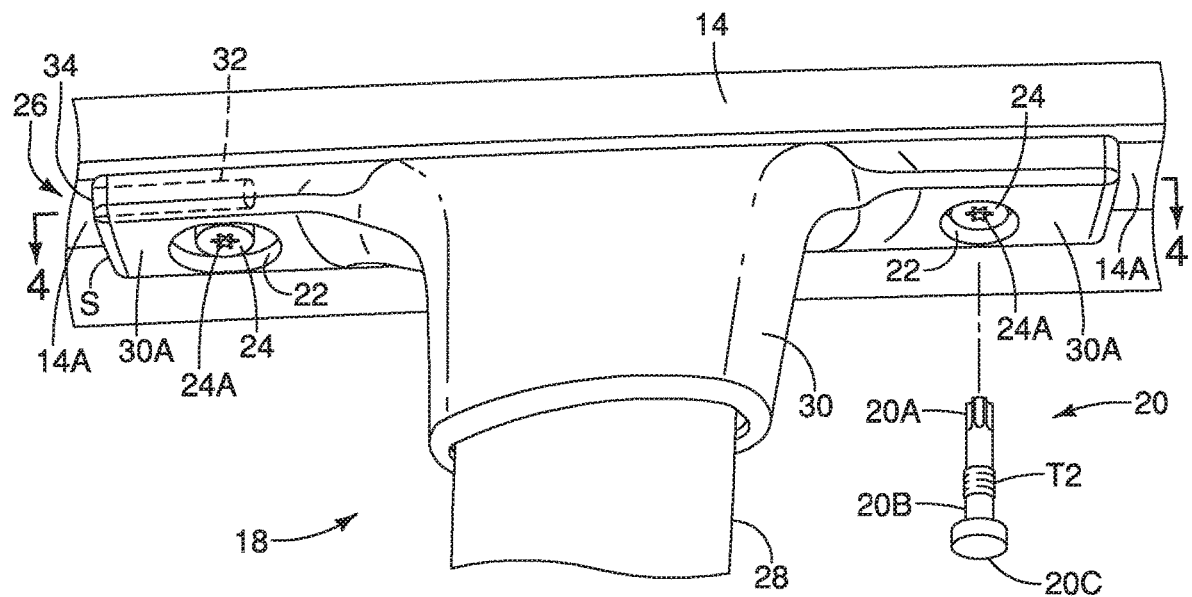
FIG. 3 is a top plane view of a portion of the crossbar installed onto a siderail of the vehicle roof rack of FIG. 1.

The siderail 14 is considered a vehicle roof rack component of the vehicle roof rack 12. As best seen in FIGS. 1 and 3, the siderail 14 is a rigid bar having a retention channel 14A extending along a longitudinal length of the siderail 14. The crossbar 18 is retained in the retention channel 14A of the siderail 14. In other words, the crossbar 18 is installed on the retention channel 14A. The retention channel 14A is disposed on a vehicle medial facing surface of the siderail 14. The retention channel 14A includes a plurality of receiving openings (not shown) that are aligned with corresponding receiving bores 22 of the crossbar 18 to receive a fastener 24 therethrough. The siderails 14 are conventional, hollow rails and will not be further discussed.

Conventional vehicle crossbars are installed onto siderails using fasteners (e.g., bolts, screws, and the like) to secure the crossbars to siderails. Typically, vehicle manufacturers and/or suppliers provide customers with an installation tool, such as a hex key or a screwdriver, for installing the fasteners to the crossbars and siderails. The installation tool and fasteners are usually provided in a pouch or a container. Because they are disposed on a roof panel, vehicle roof racks are difficult to access, making adjustments of vehicle roof rack components difficult. For customer ease and to decrease the risk of misplacing the installation tool between uses, the crossbar assembly 16 of the illustrated embodiment is provided having a tool storing area 26 for storing the installation tool 20 that is used for installing the crossbar 18 to the siderail 14. Thus, in the illustrated embodiment, the crossbar assembly 16 includes the tool storing area 26 for storing the installation tool 20 at a convenient location between uses, as will be further discussed below.

Figure 2:
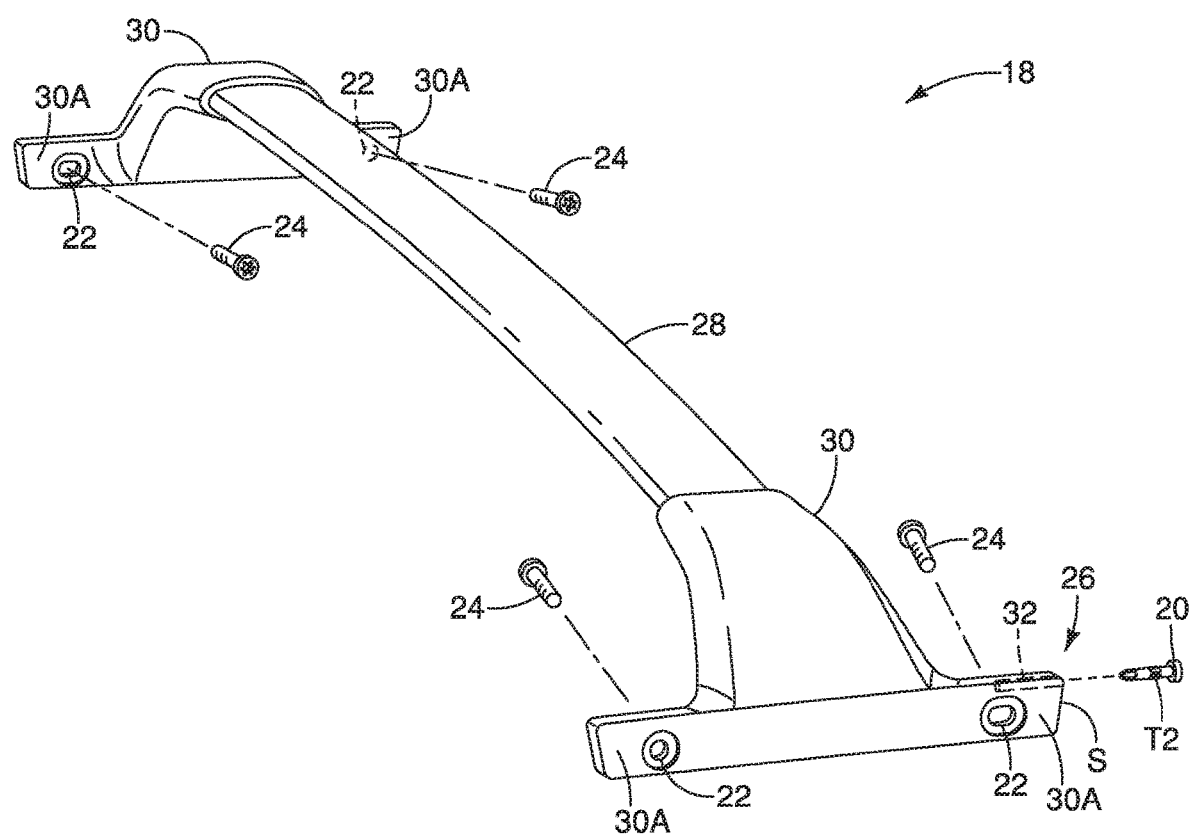
FIG. 2 is a perspective view of a crossbar of the crossbar assembly illustrated in FIG. 1.
Figure 4:
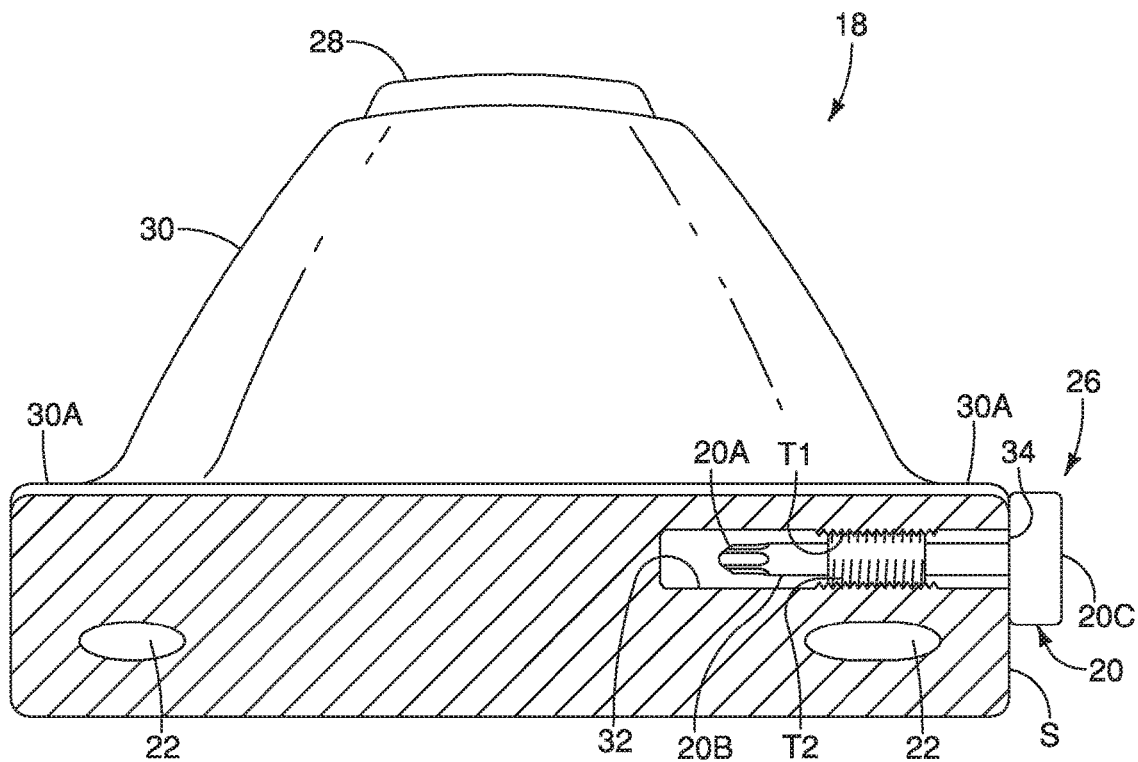
FIG. 4 is a cross-sectional view taken along section lines 4-4 of FIG. 3 showing an installation tool disposed in a tool storing area of the crossbar.

Referring to FIGS. 2 to 4, the crossbar assembly 16 includes the crossbar 18 and the installation tool 20. The crossbar assembly 16 further includes the fastener 24 used for fastening the crossbar 18 to the siderail 14. In particular, a plurality of fasteners 24 are shown as being used for installing the crossbar 18 to the siderail 14. For the vehicle roof rack 12 of the illustrated embodiment, eight fasteners 24 are used to install the crossbar assembly 16 to the siderails 14, four fasteners 24 for each crossbar 18. In the illustrated embodiment, as best seen in FIG. 3, the fastener 24 is illustrated as a bolt with a screw head having six-pointed star-shaped tool engagement part 24A. However, the fastener 24 can be other types of bolts and/or screws as needed and/or necessary. It will be apparent to those skilled in the vehicle field from this disclosure that the number and type of fasteners 24 are not essential as long as the fasteners 24 are appropriate for installing the crossbar assembly 16 to the siderails 14.

The vehicle crossbar 18 includes a longitudinal body 28 and a stanchion 30 that supports the crossbar 18 on the siderail 14. The longitudinal body 28 is made of a lightweight, rigid material, such as, metals, polymers, other suitable materials, or a combination thereof. For example, the longitudinal body 28 is made of molded aluminum. The longitudinal body 28 can be constructed to be any suitable length, width, and height as appropriate for the vehicle.

In the Figures, the stanchion 30 is one of a pair of stanchions 30 for the crossbar 18, each stanchion 30 being fixedly attached to opposite ends of the longitudinal body 28. For brevity, only one of the stanchions 30 will be discussed. As the stanchion 30 is configured to support the longitudinal body 28 to the siderail 14, the stanchion 30 supports the longitudinal body 28 to the vehicle roof rack component. The stanchion 30 is constructed of any suitable material, such as, metals, polymers, other suitable materials, or a combination thereof. For example, the stanchion 30 is preferably constructed of plastic or aluminum. The stanchion 30 can be fixed to the end of the longitudinal body 28, such as by welding or other fastening mechanisms. Alternatively, as shown in FIG. 3, the stanchion 30 can include a receiving bore 22 that receives the end of the longitudinal body 28 telescopically. Thus, the stanchion 30 can be selectively attachable to or detachable from the longitudinal body 28 as needed and/or desired.

As best seen in FIG. 3, the stanchion 30 includes at least one of the receiving bores 22 that are configured to receive the fastener 24 for installing the crossbar 18 to the vehicle roof rack component. As shown, the stanchion 30 includes a pair of receiving bores 22, each disposed on a lateral section 30A of the stanchion 30. In the illustrated embodiment, the fasteners 24 are installed to the stanchion 30 and the siderail 14 from a medial facing surface of the stanchion 30. In the illustrated embodiment, the medial facing surface is considered a surface that faces a plane that intersects a middle section of the vehicle roof panel. However, the stanchion 30 can alternatively include a coupling assembly that allows for the stanchion 30 to be installed to the siderail 14 from a different surface, as will be further discussed below. Alternatively, the stanchion 30 can be attached to the siderail 14 using other coupling mechanisms such as by a clamp and the fastener 24, as will be further discussed below.

In the illustrated embodiment, the stanchion 30 includes the tool storing area 26. However, it will be apparent to those skilled in the vehicle field from this disclosure that the longitudinal body 28 can include a tool storing area for storing the installation tool 20. In other words, the vehicle crossbar 18 includes the tool storing area 26 configured to store the installation tool 20 used for installing the crossbar 18 to the vehicle roof rack component. In particular, the tool storing area 26 includes a recess 32 and a receiving opening 34 disposed on a surface of the stanchion 30. The receiving opening 34 leads to the recess 32. Preferably, the receiving opening 34 is disposed on a rearward facing surface of the stanchion 30. In the illustrated embodiment, a rearward facing surface is considered a surface that faces in a direction towards the rear of the vehicle. The stanchion 30 is molded to include the recess 32 and the receiving opening 34. The recess 32 and receiving opening 34 can also be formed in the stanchion 30 by other conventional methods.

As shown in the illustrated embodiment, the recess 32 is threaded for securing the installation tool 20 therein. Preferably, the recess 32 is partially threaded to receive the installation tool 20. As best seen in FIG. 4, the recess 32 includes a threaded portion T1 configured to mate with a corresponding threaded portion T2 of the installation tool 20. Preferably, approximately one-third of a total length of the recess 32 is threaded. The threaded portion T1 is located at substantially a middle portion of the recess 32. In the illustrated embodiment, only one stanchion 30 of the crossbar assembly 16 is illustrated as including the tool storing area 26. However, it will be apparent to those skilled in the vehicle field from this disclosure that additional ones of the stanchions 30 can also include a tool storing area 26, as described.

The installation tool 20 is preferably a hex key with a torx tip 20A used to drive the tool engagement part 24A of the fastener 24. The installation tool 20 includes a shaft portion 20B and a head portion 20C. The corresponding threaded portion of the installation tool 20 is disposed on the shaft portion 20B of the installation tool 20. Preferably, approximately one-third of the entire length of the shaft portion 20B is threaded to correspond to the threaded portion T1 of the recess 32. Also, as shown in FIG. 4, the corresponding threaded portion T2 of the installation tool 20 has a larger diameter than the rest of the shaft portion 20B such that only the corresponding threaded portion T2 engages the recess 32. The installation tool 20 is stored in the tool storing area 26 such that the shaft portion 20B is disposed in the recess 32 and the head portion 20C protrudes from the recess 32 for user access. Preferably, the head portion 20C of the installation tool 20 has an appearance and coloring that matches the surface S of the stanchion 30. In this way, when the installation tool 20 is disposed inside the recess 32, the head portion 20C matches the appearance stanchion 30.

Figure 5:
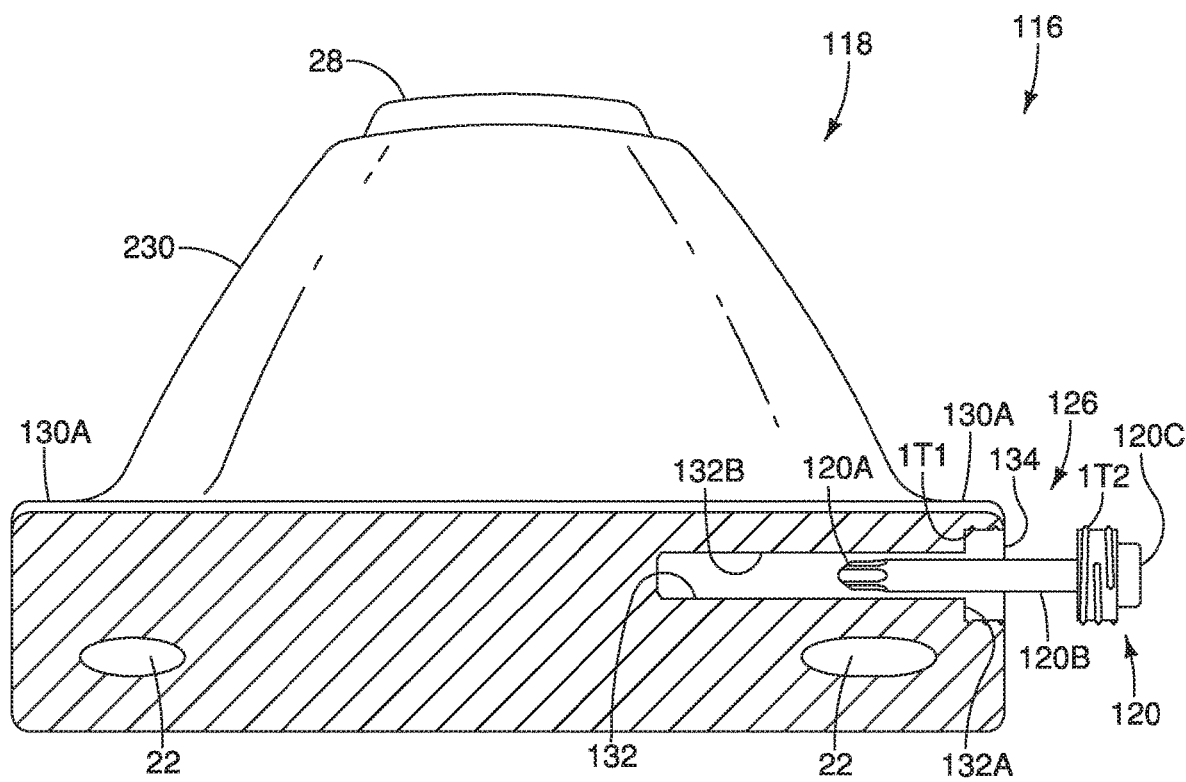
FIG. 5 is a cross-sectional view similar to FIG. 4 of a first modified crossbar with a modified installation tool that can be utilized with the vehicle roof panel of FIG. 1.
Figure 6:
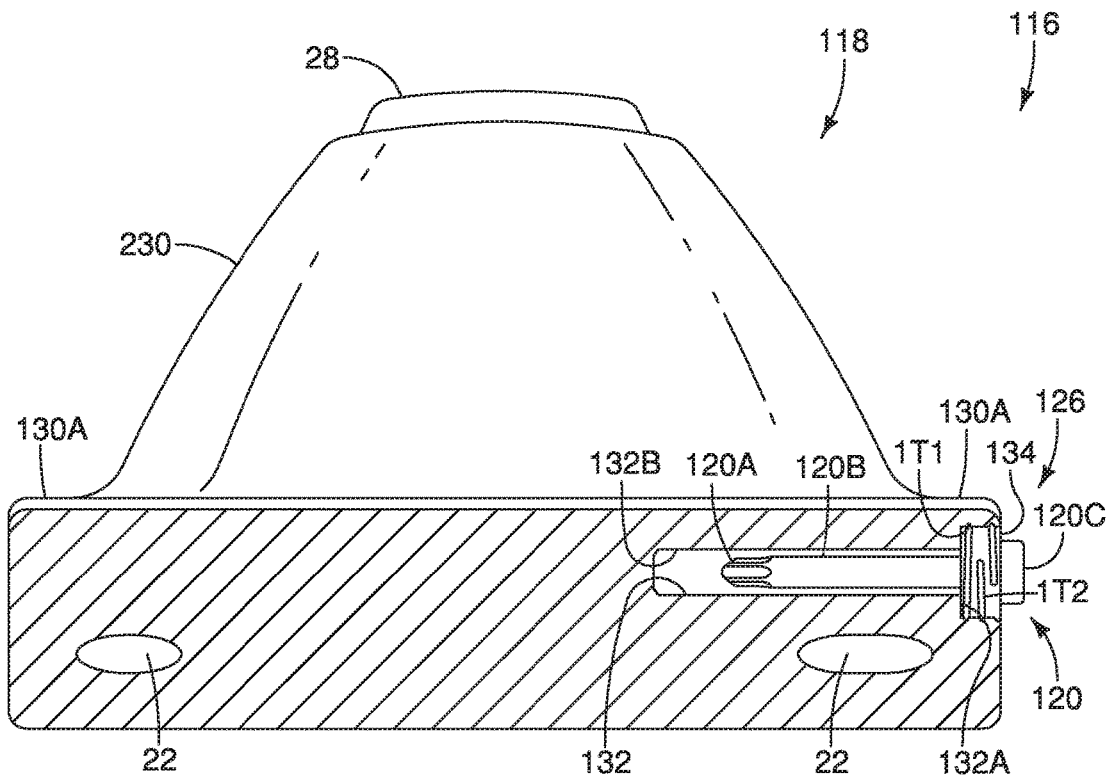
FIG. 6 is a cross-sectional view of the crossbar of FIG. 5 with the installation tool fully installed in a tool storing area of the crossbar.

Referring now to FIGS. 5 and 6, a first modified vehicle roof rack crossbar assembly 116 that can be utilized with the vehicle roof panel 10 will now be discussed. The first modification of the crossbar assembly 116 is basically identical to the crossbar assembly 16 of the first illustrated embodiment except that the crossbar assembly 116 comprises a vehicle crossbar 118 that has been modified and an installation tool 120 that has been modified. The crossbar 118 includes a tool storing area 126 that is modified for storing the modified installation tool 120. Due to the similarity between the vehicle roof rack crossbar assembly 116 and the first modified vehicle roof rack crossbar assembly 16, components of the first modified vehicle roof rack crossbar assembly 116 will receive the same reference numeral as corresponding components of the vehicle roof rack crossbar assembly 16 plus 100. Identical corresponding components will receive the same reference numerals.

The crossbar 118 includes a stanchion 130 having the tool storing area 126. In other words, the tool storing area 126 is disposed in the stanchion 130 of the crossbar 118. The tool storing area 126 includes a recess 132 and a receiving opening 134 disposed on a vehicle rearward facing surface S of the stanchion 130. The recess 132 includes a head receiving portion 132A and a shaft receiving portion 132B. The head receiving portion 132A is configured to receive a head portion 120C of the installation tool 120 and the shaft receiving portion 132B is configured to receive a shaft portion 120B of the installation tool 120. The recess 132 includes a threaded portion 1T1 configured to mate with a corresponding threaded portion 1T2 of the installation tool 120. In the modified tool storing area 126, the head receiving portion 132A includes the threaded portion 1T1. Thus, the corresponding threaded portion 1T2 of the installation tool 120 is disposed on the head portion 120C of the installation tool 120. Preferably, the threaded portion 1T1 of the recess 132 and the corresponding threaded portion 1T2 of the installation tool 120 is configured to have large threads so that the head portion 120C is fully threaded in the recess 132 in about one revolution.

Figure 7:
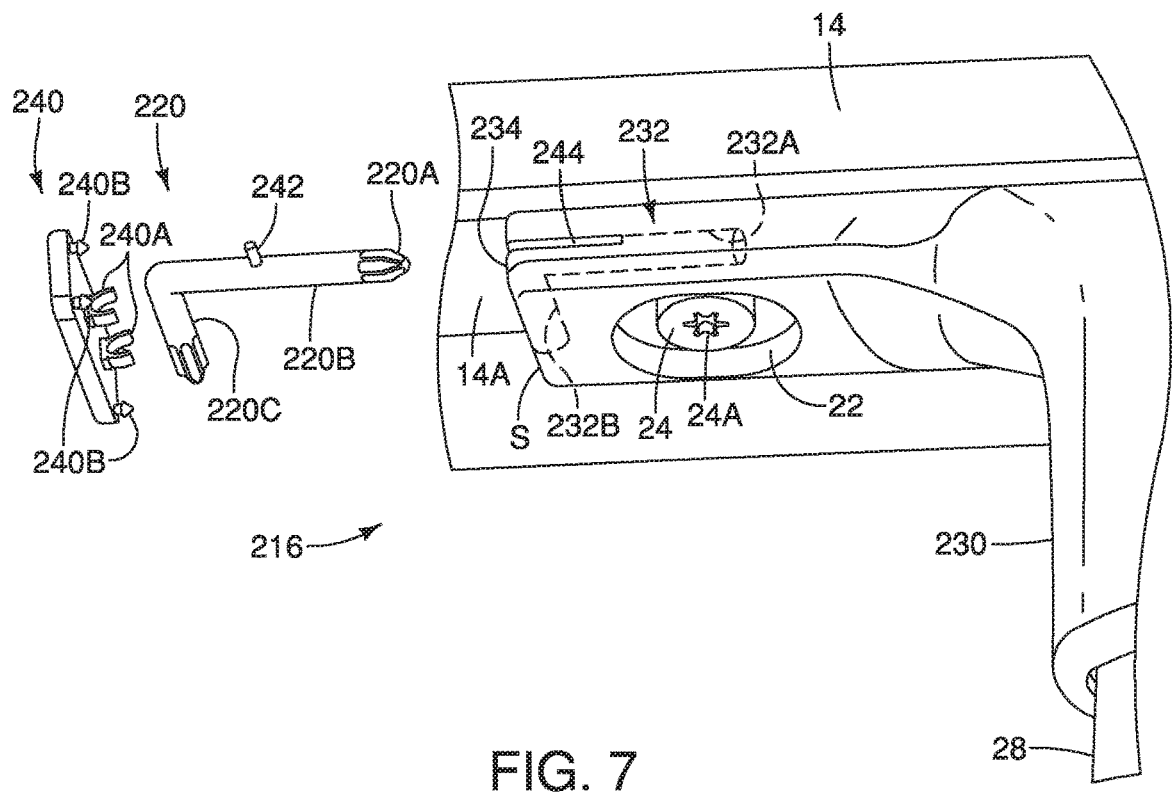
FIG. 7 is a top plan view of a portion of a second modified crossbar with a modified installation tool that can be utilized with the vehicle roof panel of FIG. 1.
Figure 8:
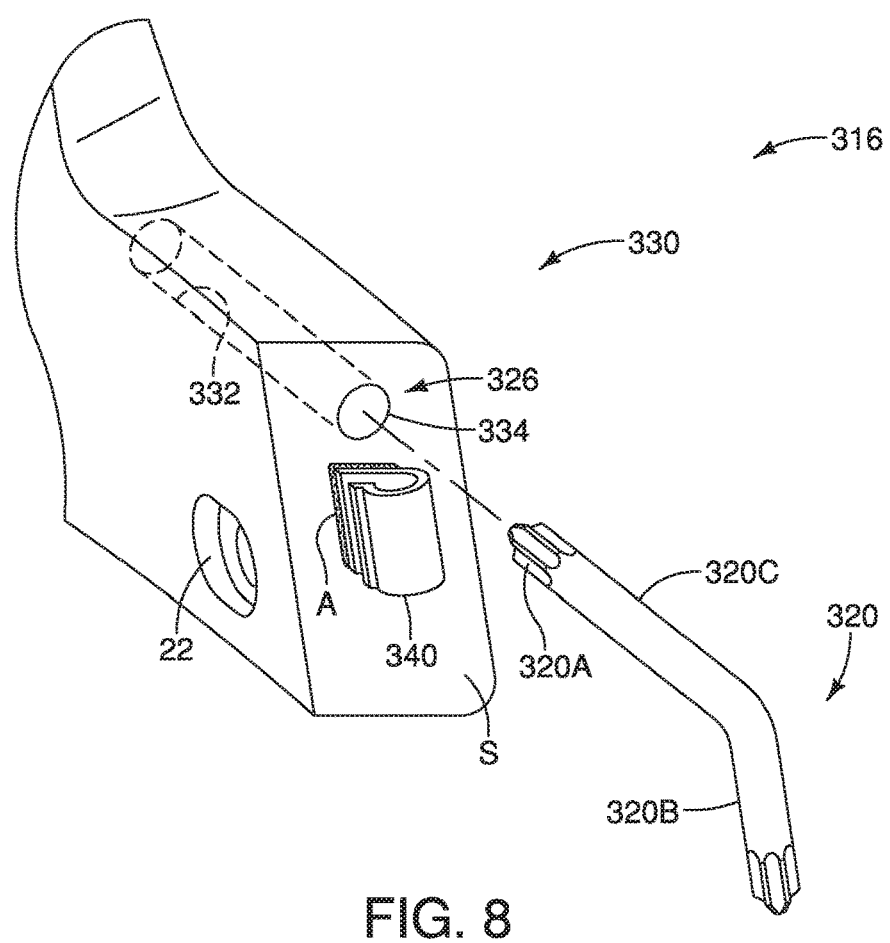
FIG. 8 is a side perspective view of a portion of a third modified crossbar with a modified installation tool that can be utilized with the vehicle roof panel of FIG. 1.
Figure 9:
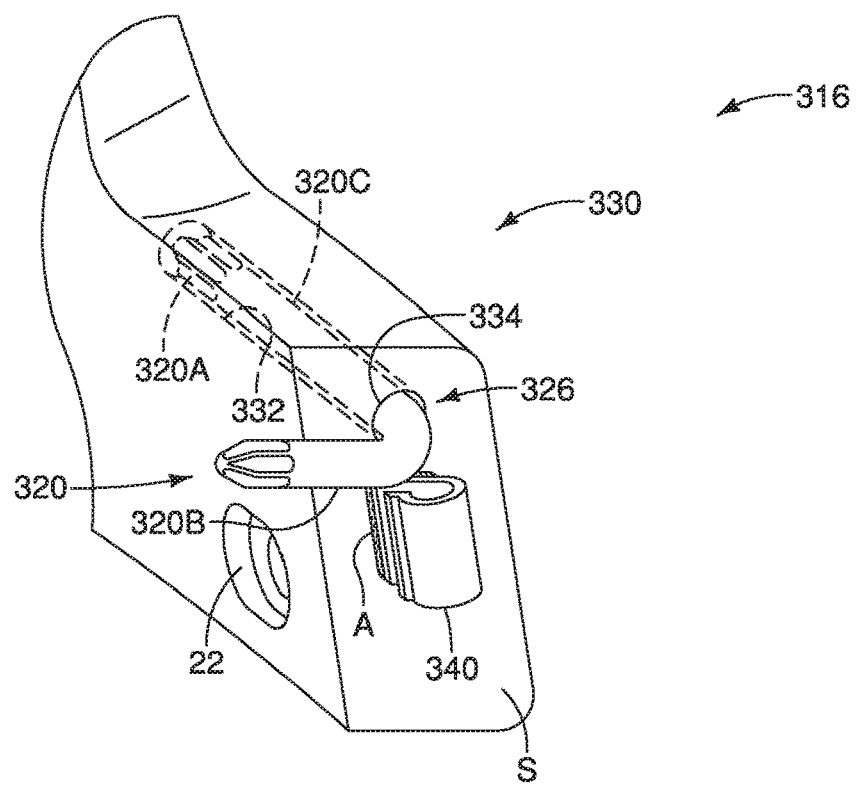
FIG. 9 is another side perspective view of the third modified crossbar with the installation tool partially stored in the tool storage area.
Figure 10:
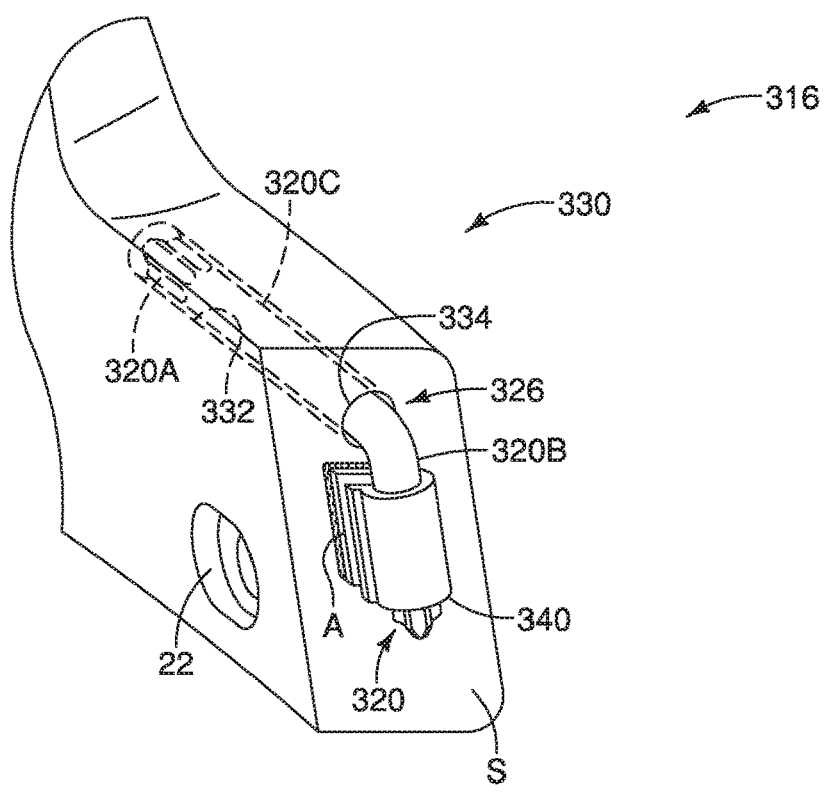
FIG. 10 another side perspective view of the third modified crossbar with the installation tool fully stored in the tool storage area.
Figure 11:
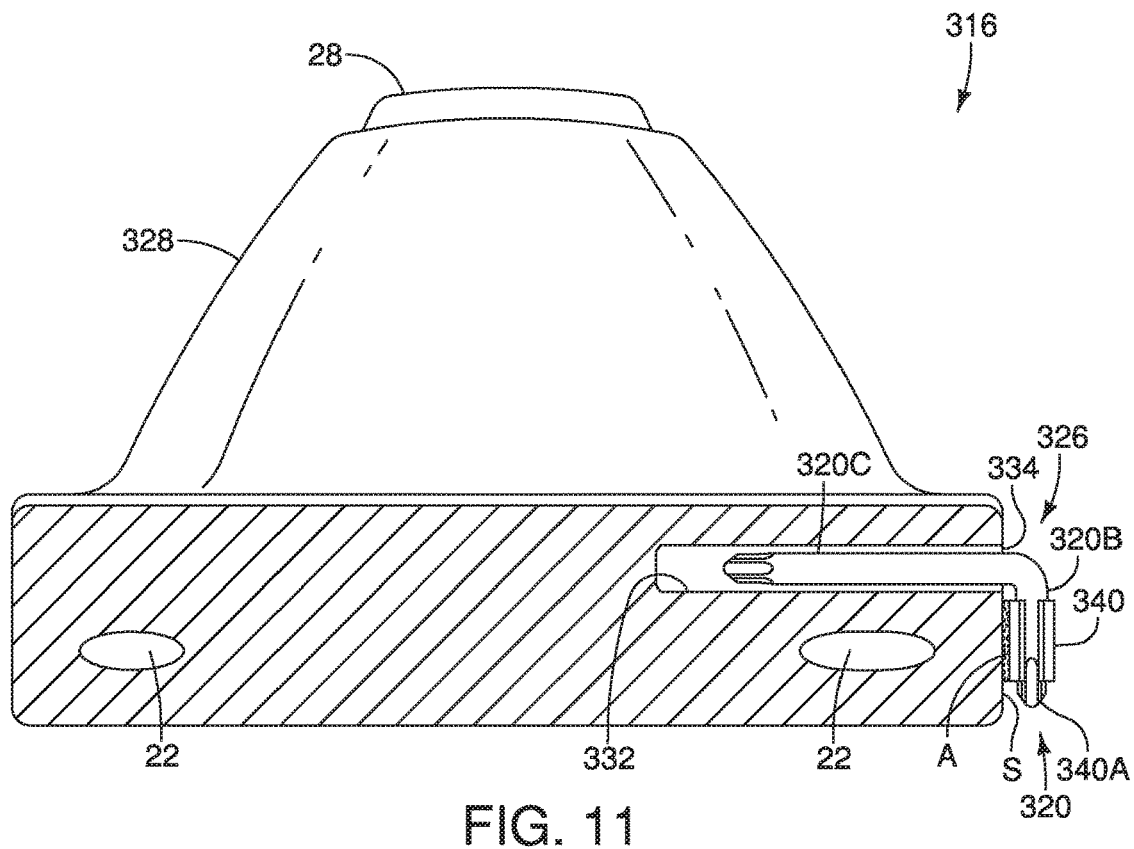
FIG. 11 is a cross-sectional view of the third modified crossbar illustrated in FIG. 10.

Referring now to FIG. 7, a second modified vehicle roof rack crossbar assembly 216 that can be utilized with the vehicle roof panel 10 will now be discussed. The second modification of the crossbar assembly 216 is basically identical to the crossbar assembly 16 of the first illustrated embodiment except that the crossbar assembly 216 comprises a vehicle crossbar 218 that has been modified and an installation tool 220 that has been modified. The crossbar 218 includes a tool storing area 226 that is modified for storing the modified installation tool 220. The crossbar 218 includes a stanchion 230 having the tool storing area 226. The second modified vehicle roof rack crossbar assembly 216 further comprises a holder 240 configured to be disposed on the stanchion 230 to receive a portion of the installation tool 220. Due to the similarity between the vehicle roof rack crossbar 218 and the second modified vehicle roof rack crossbar assembly 16, components of the second modified vehicle roof rack crossbar assembly 216 will receive the same reference numeral as corresponding components of the vehicle roof rack crossbar 16 assembly plus 200. Identical corresponding components will receive the same reference numerals.

The tool storing area 226 includes a recess 232 and a receiving opening 234. The receiving opening 234 is preferably disposed on a vehicle rearward facing surface S of the stanchion 230. The receiving opening 234 leads to the L-shaped recess 232 having a long arm receiving portion 232A and a short arm receiving portion 232B. The installation tool 220 includes an engagement part 220A that is illustrated as a torx tip. The installation tool 220 further includes a long arm portion 220B and a short arm portion 220C. The short arm portion 220C is configured to be disposed in the short arm receiving portion 232B of the recess 232. The long arm portion 220B is configured to be disposed in the long arm receiving portion 232A of the recess 232. The long arm portion 220B of the installation tool 220 is configured to be disposed in the receiving opening 234. The short arm portion 220C of the installation tool 220 is configured to be received by the holder 240.

As shown, the long arm portion 220B of the installation tool 220 includes a finger 242 that is a protrusion 240B on a surface of the long arm portion 220B. The finger slides in a groove 244 of the long arm receiving portion 232A of the recess 232 when the installation tool 220 is stored in the recess 232. The holder 240 secures the installation tool 220 inside the recess 232. The holder 240 is disposed over the receiving opening 234 to secure the installation tool 220 therein when stored. The holder 240 includes a pair of arms 240A that receive the short arm portion 220C of the installation tool 220 in a snap fit connection. While two arms 240A are shown, it will be apparent to those skilled in the vehicle field from this disclosure that the holder 240 can include a single arm 240A or additional arms 240A, as needed and/or necessary. Thus, the arms 240A of the holder 240 receive the installation tool 220 in a snap-fit connection.

As shown, the holder 240 further includes a plurality of protrusions 240B so that the holder 240 is snap-fitted to the surface of the stanchion 230. Although not shown, the surface A of the stanchion 230 includes a plurality of indentations that receive the protrusions 240B of the holder 240 in a snap fit connection to secure the holder 240 to the stanchion 230. In the second modified vehicle roof rack crossbar assembly 216, the holder 240 is considered a movable barrier. Thus, the tool storing area 226 includes the movable barrier that is disposed over the receiving opening 234 to enclose and expose the receiving opening 234. It will also be apparent to those skilled in the vehicle field from this disclosure that instead of being snap-fitted over the receiving opening 234, the movable barrier can be a hinged barrier that is hingedly disposed over the receiving opening 234 to secure the installation tool 220.

Referring now to FIGS. 8 to 11, a third modified vehicle roof rack crossbar assembly 316 that can be utilized with the vehicle roof panel 10 will now be discussed. The third modification of the crossbar assembly 316 is basically identical to the crossbar assembly 16 of the first illustrated embodiment except that the crossbar assembly 316 comprises a vehicle crossbar 318 that has been modified and an installation tool 320 that has been modified. The crossbar 318 includes a tool storing area 326 that is modified for storing the modified installation tool 320. The crossbar 318 includes a stanchion 330 having the tool storing area 326. The third modified vehicle roof rack crossbar assembly 316 further comprises a holder 340 configured to be disposed on the stanchion 330 to receive a portion of the installation tool 320. Due to the similarity between the vehicle roof rack crossbar 16 and the third modified vehicle roof rack crossbar assembly 316, components of the third modified vehicle roof rack crossbar assembly 316 will receive the same reference numeral as corresponding components of the vehicle roof rack crossbar assembly 16 plus 300. Identical corresponding components will receive the same reference numerals.

The tool storing area 326 includes a recess 332 and a receiving opening 334. The receiving opening 334 is disposed on a vehicle rearward facing surface S of the stanchion 330. The receiving opening 334 leads to the recess 332 configured to receive a portion of the installation tool 320. The installation tool 320 includes an engagement part 320A that is illustrated as being a torx tip. The installation tool 320 further includes a short arm portion 320B and a long arm portion 320C. The long arm portion 320C is configured to be disposed in the recess 332. Thus, the long arm portion 320C of the installation tool 320 is configured to be received through the receiving opening 334. The short arm portion 320B of the installation tool 320 is configured to be received by the holder 340. The holder 340 preferably receives the installation tool 320 in a snap-fit connection. As shown, the holder 340 is disposed adjacent to the receiving opening 334. In the third modified vehicle roof rack crossbar assembly 316, the holder 340 is a clip that is attached to the stanchion 330. The holder 340 can be a plastic clip or other rigid member sized and dimensioned to hold the installation tool 320. Preferably, the holder 340 is attached to the stanchion 330 by an adhesive A.

Figure 12:
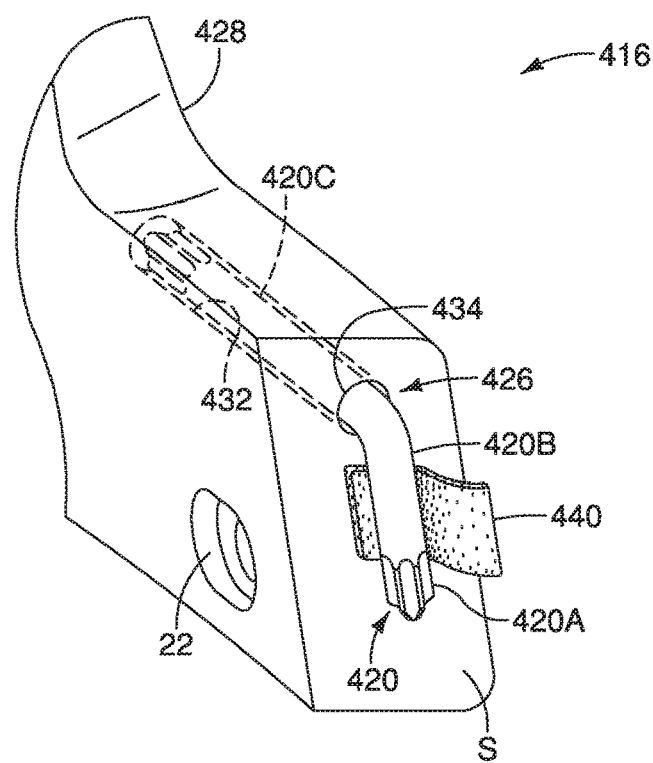
FIG. 12 a side perspective view of a portion of a fourth modified crossbar with a modified installation tool that can be utilized with the vehicle roof panel of FIG. 1

Referring now to FIG. 12, a fourth modified vehicle roof rack crossbar assembly 416 that can be utilized with the vehicle roof panel 10 will now be discussed. The fourth modification of the crossbar assembly 416 is basically identical to the crossbar assembly 16 of the first illustrated embodiment except that the crossbar assembly 416 comprises a vehicle crossbar 418 that has been modified and an installation tool 420 that has been modified. The crossbar 418 includes a tool storing area 426 that is modified for storing the modified installation tool 420. The crossbar 418 includes a stanchion 430 having the tool storing area 426. The fourth modified vehicle roof rack crossbar assembly 416 further comprises a holder 440 configured to be disposed on the stanchion 430 to receive a portion of the installation tool 420. Due to the similarity between the vehicle roof rack crossbar assembly 16 and the fourth modified vehicle roof rack crossbar assembly 416, components of the fourth modified vehicle roof rack crossbar assembly 416 will receive the same reference numeral as corresponding components of the vehicle roof rack crossbar assembly 16 plus 400. Identical corresponding components will receive the same reference numerals.

The tool storing area 426 includes a recess 432 and a receiving opening 434. The receiving opening 434 is disposed on a vehicle rearward facing surface S of the stanchion 430. The receiving opening 434 leads to the recess 432 that is configured to receive a portion of the installation tool 420. The installation tool 420 includes an engagement part 420A that is illustrated as a torx tip. The installation tool 420 further includes a short arm portion 420B and a long arm portion 420C. The long arm portion 420C is configured to be disposed in the recess 432. Thus, the long arm portion 420C of the installation tool 420 is configured to be received through the receiving opening 434. The short arm portion 420B of the installation tool 420 is configured to be received by the holder 440. As shown, the holder 440 is disposed adjacent to the receiving opening 434 to receive the portion of the installation tool 420.

In the third modified vehicle roof rack crossbar assembly 416, the holder 440 is preferably an adhesive tape having hoop and loop fasteners (e.g., Velcro®) on engaging sides to secure the installation tool 420 therebetween. The holder 440 has an adhesive side that is taped to the surface S of the stanchion 430. Thus, the holder 440 is attached to the stanchion 430 by an adhesive A.

Figure 13:
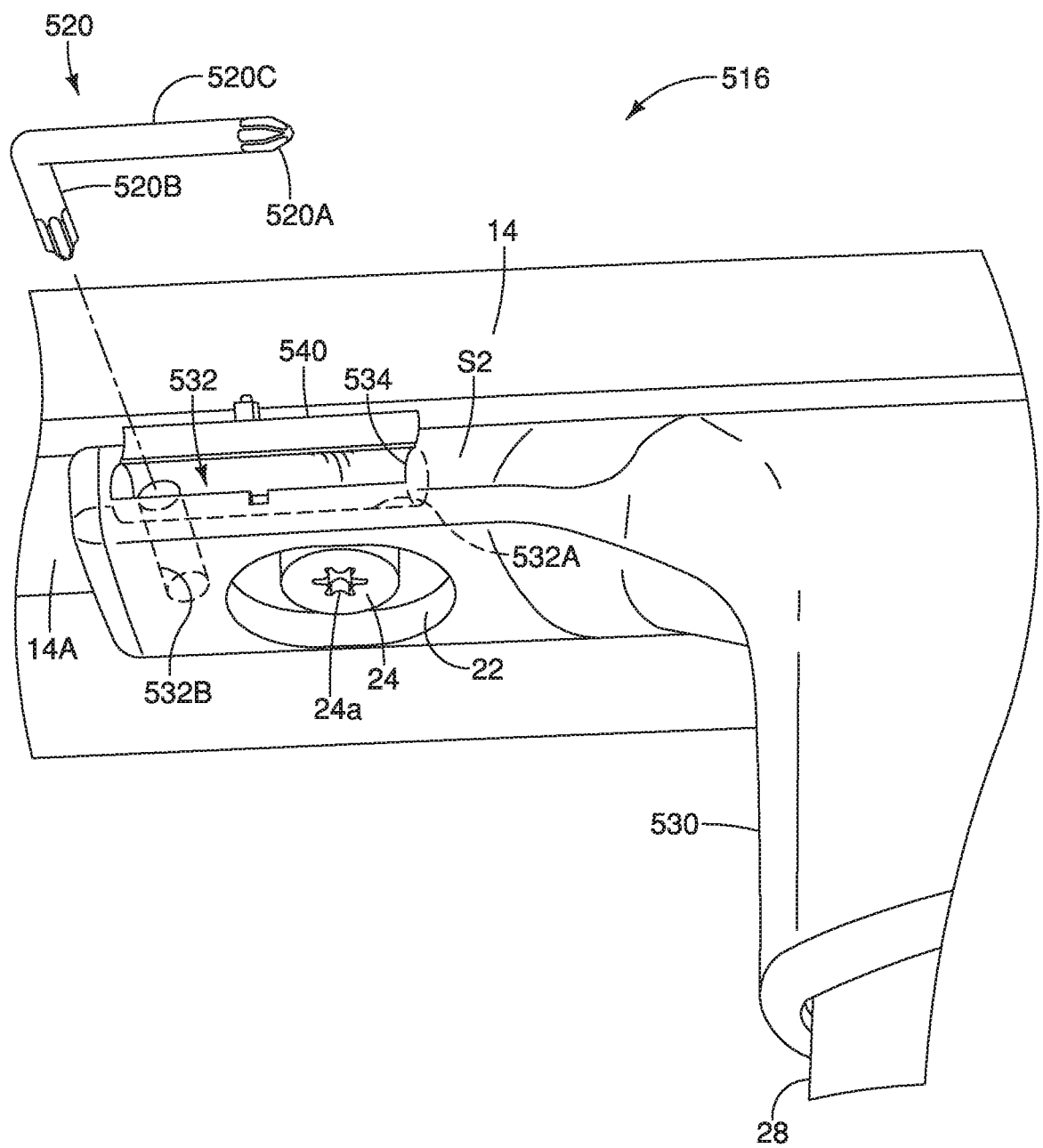
FIG. 13 is a top plan view of a portion of a fifth modified crossbar with a modified installation tool that can be utilized with the vehicle roof panel of FIG. 1.

Referring now to FIG. 13, a fifth modified vehicle roof rack crossbar assembly 516 that can be utilized with the vehicle panel 10 will now be discussed. The fifth modification of the crossbar assembly 516 is basically identical to the crossbar assembly 16 of the first illustrated embodiment except that the crossbar assembly 516 comprises a vehicle crossbar 518 that has been modified and an installation tool 520 that has been modified. The crossbar 518 includes a tool storing area 526 that is modified for storing the modified installation tool 520. The crossbar 518 includes a stanchion 530 having the tool storing area 526. Due to the similarity between the vehicle roof rack crossbar assembly 16 and the fifth modified vehicle roof rack crossbar assembly 516, components of the fifth modified vehicle roof rack crossbar assembly 516 will receive the same reference numeral as corresponding components of the vehicle roof rack crossbar assembly 16 plus 500. Identical corresponding components will receive the same reference numerals.

The tool storing area 526 includes a recess 532 and a receiving opening 534. The receiving opening 534 is disposed on a surface S2 of the stanchion 530 that is transverse to a surface having the roof panel 10. The receiving opening 534 leads to the L-shaped recess 532 having a long arm receiving portion 532A and a short arm receiving portion 532B. The installation tool 520 includes an engagement part 520A that is illustrated as a torx tip. The installation tool 520 further includes a short arm portion 520B and a long arm portion 520C. The short arm portion 520B is configured to be disposed in the short arm receiving portion 532B of the recess 532. The long arm portion 520C is configured to be disposed in the long arm receiving portion 532A of the recess 532. The tool storing area 526 includes a movable barrier 540 disposed over the receiving opening 534 to enclose and expose the receiving opening 534. In the fifth modified vehicle roof rack crossbar assembly 516, the movable barrier 540 is considered a hinged door that is snap-fitted over the recess 532. The movable barrier 540 opens from the surface S2 of the stanchion 530 that is a non-vehicle facing surface. In other words, the surface S2 faces a direction away from the roof panel 10. In the illustrated embodiment, the surface S2 faces a direction laterally away from a plane intersecting a middle point of the roof panel 10.

Figure 14:
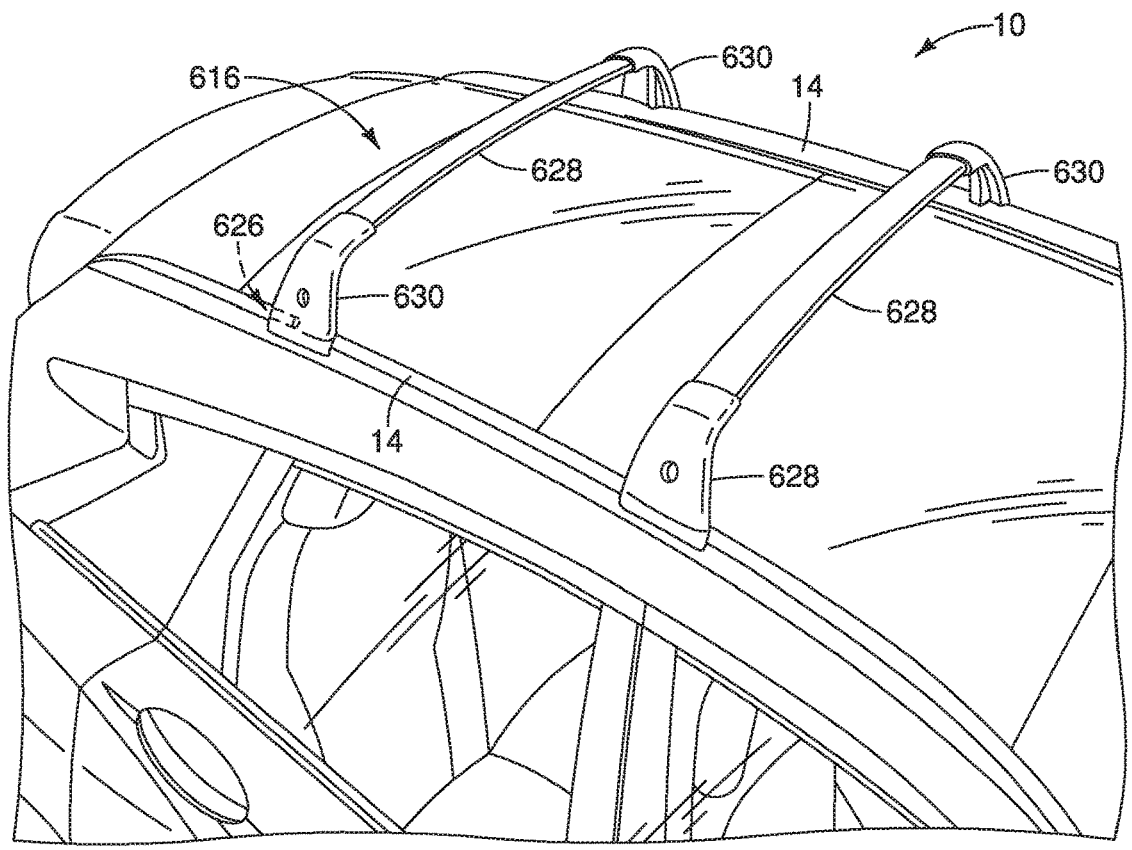
FIG. 14 is a top perspective view of the vehicle roof panel of FIG. 1 equipped with a crossbar assembly having a sixth modified crossbar.
Figure 15:
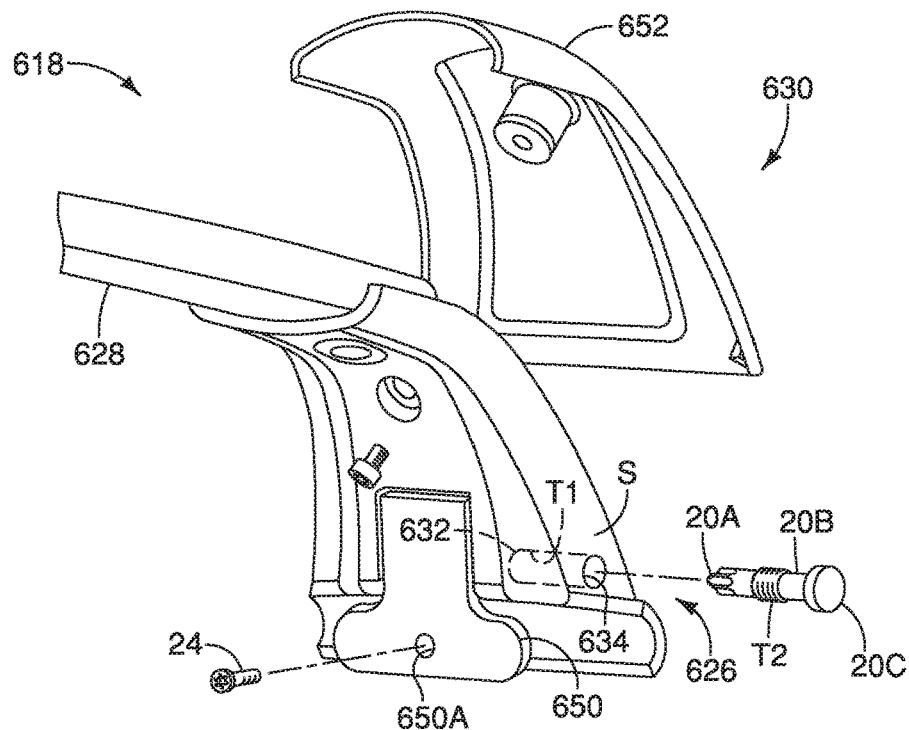
FIG. 15 is a perspective view of a portion of the sixth modified crossbar equipped with a tool storing area and an installation tool.

Referring now to FIGS. 14 and 15, a sixth modified vehicle roof rack crossbar assembly 616 that can be utilized with the vehicle roof panel 10 will now be discussed. The sixth modification of the crossbar assembly 616 is basically identical to the crossbar assembly 16 of the first illustrated embodiment except that the crossbar assembly 616 comprises a vehicle crossbar 618 that has been modified and includes the installation tool 20 that is identical to the installation tool 20 the first illustrated embodiment. The crossbar 618 of the sixth modified vehicle roof rack crossbar assembly 616 is attached to the siderail 14 via a clamp 650 and a fastener 24 that is identical to the fastener 24 of the first illustrated embodiment. The crossbar 618 further includes a tool storing area 626 for storing the installation tool 20. The crossbar 618 includes a stanchion 630 having the tool storing area 626. Due to the similarity between the vehicle roof rack crossbar assembly 16 and the sixth modified vehicle roof rack crossbar assembly 616, components of the sixth modified vehicle roof rack crossbar assembly 616 will receive the same reference numeral as corresponding components of the vehicle roof rack crossbar assembly 16 plus 600. Identical corresponding components will receive the same reference numerals.

In the sixth modification of the crossbar assembly 616, the clamp 650 is part of a coupling assembly (not shown) of the stanchion 630 that detachably couples the stanchion 630 to the siderail 14. The stanchion 630 includes a cover 652 that encloses the coupling assembly. The stanchion 630 clamps onto the siderail 14 with the clamp 650. The clamp 650 is thereafter further secured to the siderail 14 via the fastener 24 that passes through a bore 650A of the clamp 650 and a through hole (not shown) of the siderail 14 using the installation tool 20. Please see U.S. patent application Ser. No. 16/119,117 for more information regarding the coupling assembly of the stanchion 630 of the sixth modified vehicle roof rack crossbar assembly 616.

The tool storing area 626 includes a receiving opening 634 that leads to a recess 632 that is preferably disposed on a rearward facing surface S of the stanchion 630. The recess 632 includes a threaded portion (not shown) that is configured to receive a corresponding threaded portion T2 of the installation tool 20 in the same way as described in the first illustrated embodiment. While the stanchion 630 is illustrated as including the tool storing area 626 and the installation tool 20 of the first illustrated embodiment, it will be apparent to those skilled in the vehicle field from this disclosure that the stanchion 630 can be alternatively modified to include any of the variations discussed in any of the first to fifth modified vehicle roof rack crossbar assemblies 18 to 518.

General Interpretation of Terms

In understanding the scope of the present invention, the term "comprising" and its derivatives, as used herein, are intended to be open ended terms that specify the presence of the stated features, elements, components and/or groups but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward" as well as any other similar directional terms refer to those directions of a vehicle equipped with the vehicle roof rack crossbar assembly. Accordingly, these terms, as utilized to describe the present invention should be interpreted relative to a vehicle equipped with the vehicle roof rack crossbar assembly.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle roof rack crossbar assembly comprising:
    a vehicle crossbar including a longitudinal body and a stanchion configured to support the longitudinal body to a vehicle roof rack component, the stanchion including at least one receiving bore configured to receive a fastener for installing the crossbar to the vehicle roof rack component, the vehicle crossbar further including a tool storing area configured to store an installation tool that is used for installing the crossbar to the vehicle roof rack component, the tool storing area including a recess and a receiving opening that leads to the recess for receiving the installation tool into the recess, the receiving opening being disposed on a surface of the stanchion; and
    the installation tool.

2. The vehicle roof rack crossbar assembly according to claim 1, wherein
    the stanchion includes at least one receiving bore configured to receive a fastener for installing the crossbar to the vehicle roof rack component.

3. The vehicle roof rack crossbar assembly according to claim 2, wherein
    the receiving opening and the receiving bore are offset with respect to each other on the surface of the stanchion.

4. The vehicle roof rack crossbar assembly according to claim 1, further comprising
    the fastener.

5. The vehicle roof rack crossbar assembly according to claim 1, wherein
    the stanchion is one of a pair of stanchions, each stanchion being fixedly attached to opposite ends of the longitudinal body.

6. The vehicle roof rack crossbar assembly according to claim 1, wherein
    the receiving opening is disposed on a vehicle rearward facing surface of the stanchion.

7. The vehicle roof rack crossbar assembly according to claim 2, further comprising
    a holder configured to be disposed on the surface of the stanchion to receive a portion of the installation tool.

8. The vehicle roof rack crossbar assembly according to claim 7, wherein
    the installation tool includes a long arm portion and a short arm portion, the long arm portion of the installation tool being configured to be received in the receiving opening and the short arm portion being configured to be received by the holder.

9. The vehicle roof rack crossbar assembly according to claim 8, wherein
    the holder receives the installation tool in a snap-fit connection.

10. The vehicle roof rack crossbar assembly according to claim 9, wherein
    the holder is disposed over the receiving opening.

11. The vehicle roof rack crossbar assembly according to claim 8, wherein
    the holder is disposed adjacent to the receiving opening.

12. The vehicle roof rack crossbar assembly according to claim 7, wherein
the holder is attached to the stanchion by an adhesive.

13. The vehicle roof rack crossbar assembly according to claim 2, wherein
the tool storing area includes a movable barrier disposed over the receiving opening to enclose and expose the receiving opening.

14. The vehicle roof rack crossbar assembly according to claim 13, wherein
the receiving opening is disposed on a non-vehicle facing surface of the stanchion.

15. The vehicle roof rack crossbar assembly according to claim 14, wherein
the receiving opening is disposed on a vehicle rearward facing surface of the stanchion.

16. A vehicle roof rack crossbar assembly comprising:
a vehicle crossbar including a longitudinal body and a stanchion configured to support the longitudinal body to a vehicle roof rack component, the vehicle crossbar further including a tool storing area configured to store an installation tool that is used for installing the crossbar to the vehicle roof rack component, the tool storing area including a recess and a receiving opening disposed on a surface of the stanchion, the recess including a threaded portion configured to mate with a corresponding threaded portion of the installation tool; and
the installation tool.

17. The vehicle roof rack crossbar assembly according to claim 16, wherein
the corresponding threaded portion of the installation tool is disposed on a shaft portion of the installation tool.

18. The vehicle roof rack crossbar assembly according to claim 16, wherein
the corresponding threaded portion of the installation tool is disposed on a head portion of the installation tool.

19. A vehicle roof rack crossbar assembly comprising:
a vehicle crossbar including a longitudinal body and a stanchion configured to support the longitudinal body to a vehicle roof rack component, the vehicle crossbar further including a tool storing area configured to store an installation tool that is used for installing the crossbar to the vehicle roof rack component, the tool storing area including a recess and a receiving opening disposed on a surface of the stanchion, the receiving opening leading to an L-shaped recess having a short arm receiving portion and a long arm receiving portion; and
the installation tool.

20. The vehicle roof rack crossbar assembly according to claim 19, wherein
the installation tool includes a short arm portion configured to be disposed in the short arm receiving portion of the recess and a long arm portion configured to be disposed in the long arm receiving portion of the recess.

* * * * *